Oct. 13, 1970    A. LEDERMAN ET AL    3,533,855
ELECTRICAL MEASUREMENT DEVICES
Filed March 17, 1965    2 Sheets-Sheet 1

INVENTORS
ALBERT LEDERMAN
FRANCIS A. LYDON
BY

INVENTORS.
ALBERT LEDERMAN
FRANCIS A. LYDON
BY

ATTORNEY

United States Patent Office 3,533,855
Patented Oct. 13, 1970

3,533,855
ELECTRICAL MEASUREMENT DEVICES
Albert Lederman, 1349 Lexington Ave., New York, N.Y. 10028, and Francis A. Lydon, 188 Clark St., Bloomingdale N.J. 07403
Filed Mar. 17, 1965, Ser. No. 440,505
Int. Cl. H01v 1/32
U.S. Cl. 136—207                                    16 Claims

ABSTRACT OF THE DISCLOSURE

A thermal converter that can be calibrated with accurate power is capable of measuring radio frequency power well into the microwave region with a high degree of accuracy. The response of the output voltage to the input power is linear, thereby permitting the use of easily read meter scales. The power measurement apparatus being easily calibrated is also reliable and stable under varying ambient temperature conditions.

---

This invention relates to devices for making electrical measurements, particulrly the root mean square (RMS) value. The invention contemplates novel thermal converters capable of making alternating-current measurements to a high degree of accuracy at frequencies well into the microwave range of frequencies.

Existing measurement devices including voltmeters, ammeters, and wattmeters for the measurement of RMS values employ thermal converters which are fragile, susceptible to burnout and subject to changes in accuracy due to changes in ambient temperature conditions. Moreover, the nature of existing thermal converters using metallic heaters in thermal contact with metallic thermocouples tend to depart from square law indications particularly at higher input levels. As a consequence meter scales for the indication of measurements have to be drawn specially to match the responsivity for individual thermal converters and as a result interchangeability of thermal converters is often not practical because of the inability of different thermal converters to track each other when pre-printed scales are employed on the indicating meters. Furthermore existing thermal converters using metallic components and designed for measuring relatively low-level signals suffer from changes in response because of their fragile construction. They are very delicate and susceptible to change in characteristics as a consequence of comparatively slight electrical overloads.

It is accordingly an immediate object of this invention to provide stable, rugged and reproducible thermal converters for use in electrical measurements. It is a further object to provide thermal converters to operate for relatively long time periods under varying ambient temperature conditions with a high degree of stability.

Another object of this invention is to provide thermal converters with substantially greater electrical overload capabilities than was hitherto possible.

Another object of this invention is to increase the frequency of response of thermal converters well into the microwave region and beyond.

A further object of this invention is to provide a thermal converter that is inherently less expensive and more rugged thereby making it suitable for use in instruments outside of laboratory environments.

A still further object of this invention is to provide a novel microwave power meter employing the thermal converter of the type described having self-contained calibrating means.

Still another object of this invention is to provide a stable and accurate thermal converter for direct current (DC) substitution measurements in instruments to measure voltage, currents, and power over a wide frequency range.

Other advantages and uses of the invention will become apparent upon reference to the specification and drawings in which.

In accordance with the principles of the present invention, a thermal transfer mechanism is provided by means of an extremely small resistor that functions as the electrical heater in thermal contact with a thermojunction, particularly a semiconductor thermojunction. The electromotive force developed at the output terminals by thermoelectric action is a measure of the input current at the heater. The effect of an applied electrical signal is to raise the temperature of the resistor which is sensed by the semiconductor thermojunction and is utilized to produce an output signal. The heater of the thermal converter utilizes resistive material that is concentrated into extremely small volume so as to constitute a resistor in intimate thermal contact with the thermojunction. The resistive material is of high resistivity, and connection to this material is made by a fine wire. The elements forming the thermojunction are of thermoelectric semiconductor material, and they provide support for the resistor.

The sources of heat loss that do not contribute to the conversion accuracy of the thermal converter are minimized. Radiation losses are minimized because the resistor is of minimized size, being confined to the thermojunction, and because of the relatively low temperature of operation of the heater utilized in accordance with a further feature of the present invention, as compared to 5 to 8 times higher temperature of operation of the heaters in conventional thermal converters. Conduction losses are significantly minimized because the fine wire which is used for making connection to the resistive material and which serves as a good electrical conductor, minimizes the flow of heat away from the junction. The heat losses due to thermal transfer in elements forming the thermojunction is minimized by using thermoelectric semiconductor material to form the thermojunction and to support the concentrated resistive material, the function of the fine metallic wires being to serve as electrical contacts.

Figure 1:
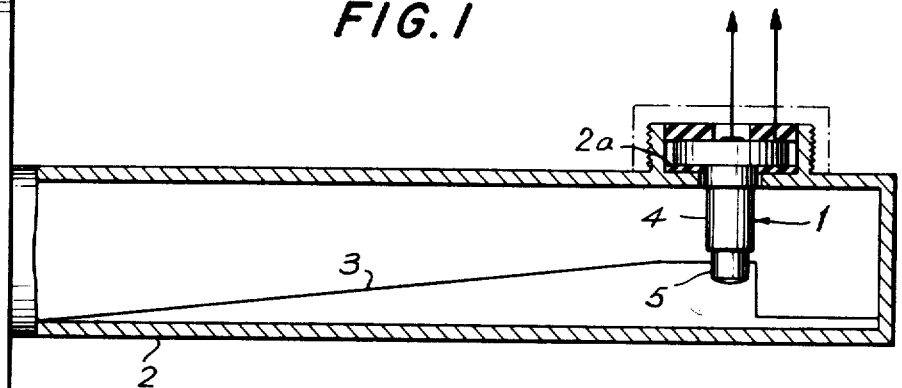
FIG. 1 is a side elevation partly in section, showing one modification of the thermal converter and waveguide mount assembly.

FIG. 1 shows one embodiment of a microwave wattmeter embodying certain principles of the present invention. The wattmeter consists of an indicating millivolt meter which responds to the RMS value of the microwave energy absorbed by the heater in the thermal converter. According to the principles of the present invention the scale reading on indicating meter will be directly proportional to the incident microwave power and therefore be an accurate indication of RF power.

The thermal converter 1 is mounted in a conventional waveguide 2 such that the incident RF power is matched into the heater in the thermal converter by means of the ridged section 3 in waveguide 2. A DC blocking by-pass capacitor 2a is incorporated in the portion of the waveguide that receives the thermal converter.

Figure 2:
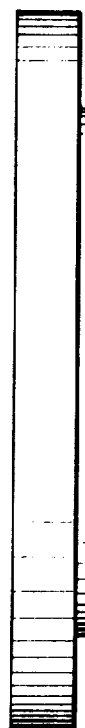
FIG. 2 is an enlarged longitudinal cross-section of the thermal converter employed in FIG. 1.
Figure 2:
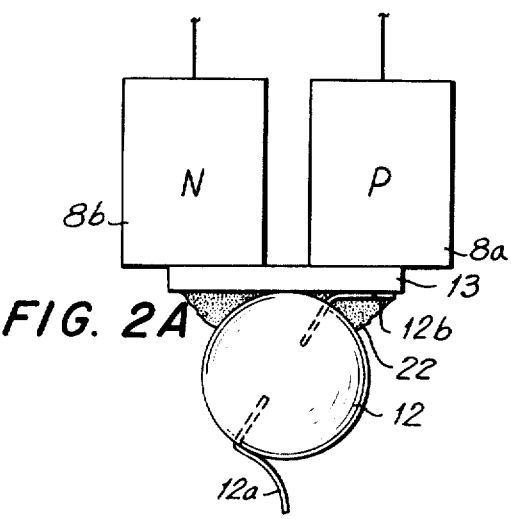
Figure 2A:
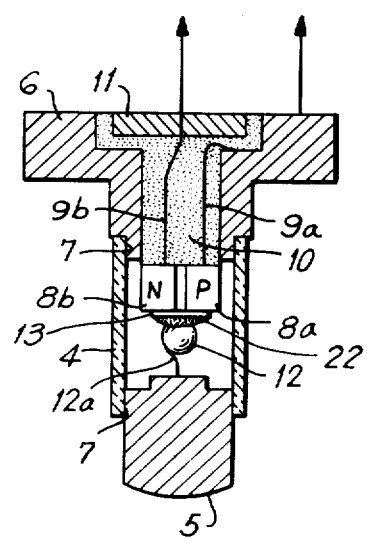
FIG. 2A is a greatly enlarged longitudinal cross-section of part of the thermal converter in FIG. 2.

Thermal converter 1 is shown in detail in FIG. 2. An insulator tube 4 such as Rexolite or alumina supports prong 5 to head 6. Prong 5 and head 6 are fabricated of brass which is gold or silver-plated to minimize RF losses and is sealed to insulator 4 by means of an epoxy adhesive 7. Prior to the sealing, a thermoelectric semiconductor thermojunction is assembled to head 6 by means of an electrically insulating cement. This cement may be an epoxy which contains a thermally conducting filler 10 such as powdered aluminum. Electrical contact to the type P thermoelectric semiconductor 8a is made by lead 9a to the head 6 by soldering, and electrical contact is made by lead 9b from the type N thermoelectric semiconductor 8b to a metallic disc 11 which is insulated from head 6 by means of epoxy adhesive 10. Resistor 12 is in intimate thermal contact with the junction of the P and N semiconductors. The junction, here, is formed by suitable means such as a nickel strap 13 which is soldered to the semiconductors. One resistor lead 12a is soldered to prong 5 and another resistor lead 12b is soldered to metal strap 13. The resistor element 12 placed in physical contact to strap 13 and minimum amount of heat-conductive element is additionally used to insure optimum heat transfer. Signal input is impressed at elements 5 and 6, and direct-current output appears at elements 6 and 11. Leads to base 6 and disc 11 may be interchanged to reverse the output polarity.

The dimensions of the thermal converter mount in accordance with FIG. 2 have been chosen to provide a broadband match with the voltage standing wave ratio (VSWR) of less than 1.5:1 over the band 8.2 to 12.4 gc. using conventional techniques. The VSWR of less than 1.5:1 signifies that 96% or more of the RF power is absorbed by the resistor 12 which serves as the heater in the thermal converter in the device of FIG. 2. An indicating meter will then respond to the RMS value of the RF power in direct square-law relationship, this being that the voltage output is directly proportional to the RF power input. Results have indicated sensitivities of from .5 to 1.0 mv./mw. with a full scale indication on the meter of 15 millivolts.

Figure 3:
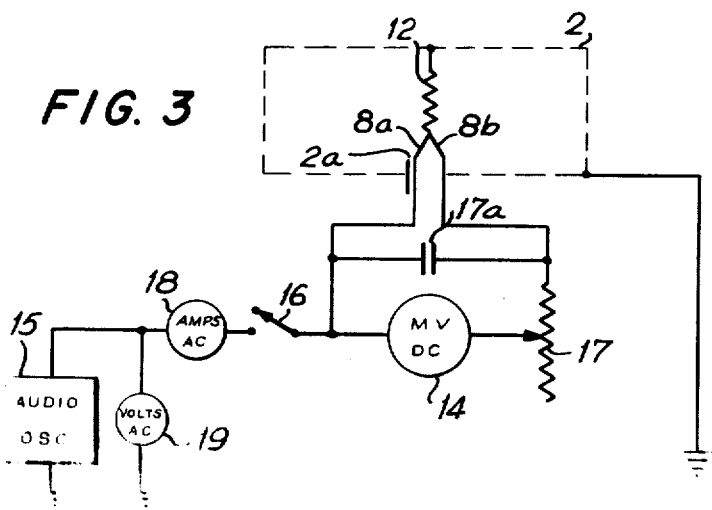
FIG. 3 is a schematic diagram showing the electrical circuitry involved in one aspect of the invention.

FIG. 3 is a circuit diagram showing the electrical connections employed in an embodiment of the invention as a microwave power meter with means for self-calibration. Leads from elements 8a and 8b are connected to indicating meter 14. The microwave power in ridged mount 2 is absorbed by resistive heater 12 and the corresponding temperature rise directly proportional to the RF power is indicated on meter 14.

A switch 16 connects a power source 15 and ammeter 18 to one terminal of resistor 12 via semiconductor element 8a. The other terminal of resistor 12 is grounded in wave guide 2 and to the ground of supply 15. The output voltage of supply 15 is indicated on voltmeter 19.

With the microwave power interrupted, calibration of meter 14 is obtained by setting switch 16 so that audio oscillator 15 furnishes a constant-power audio-frequency signal into resistor 12. The magnitude of the audio power is measured conveniently and accurately at audio frequencies by means of ammeter 18 and voltmeter 19. Corresponding to the given audio power a reference calibration mark is noted on scale of meter 14 and the meter pointer is set to the mark by means of adustment of potentiometer 17. Switch 16 is then opened. In the presence of a microwave signal, resistive heater 12 absorbs the RF power causing an output through variable resistor 17 to the millivolt meter 14. This output is directly proportional to the scale mark reference set by the audio power previously noted. For example if the reference mark was set for 15 mw. of audio power at full scale, then a full scale indication of microwave power will be 15 mw., ½ scale 7.5 mw., ⅓ full scale will be 5 mw., etc. In the event calibration is required when a thermal converter is replaced, the inherent square law response of the thermal converter makes it unnecessary to alter or redraw the scale.

The use of an audio supply rather than a direct-current supply eliminates extraneous DC effects from the calibration circuit. Audio bypass capacitor 17a shunts the meter 14, and effectively connects elements 8a and 8b in parallel in the audio frequency energizing connection to resistor 12.

The resistive heater 12 is approximately a sphere with a .015" diameter. It is constructed with fine wire leads 12a and 12b such as platinum .001" diameter supporting of resistive body which contains oxides of palladium mixed with palladium, silver and glass powders and sintered at temperatures that can reach 750° C. Resistive heaters thus made have exhibited temperature coefficients of less than 300 parts per million over the tempeiature range of −65° C. to +85° C. Highly successful thermoelements 8a and 8b have been formed of bismuth telluride rods .070 inch long and .015 by .015 inch thick. Thermal converters made in accordance with the principles of the present invention have withstood electrical overloads of over 20 times rated power as compared to a maximum of 50% overload capability of typical vacuum thermocouples.

Figure 4:
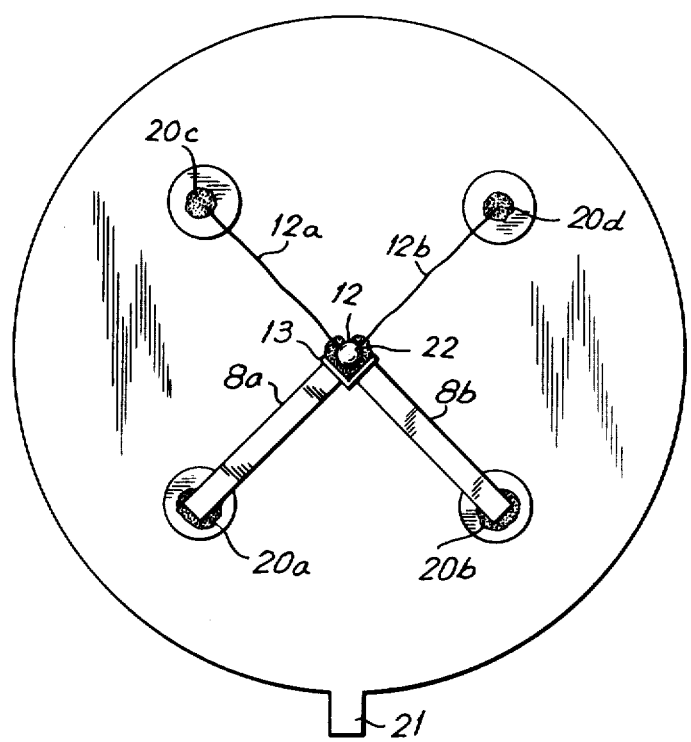
FIG. 4 is a top view showing the thermal converter with the heater insulated from the thermojunction.
Figure 5:
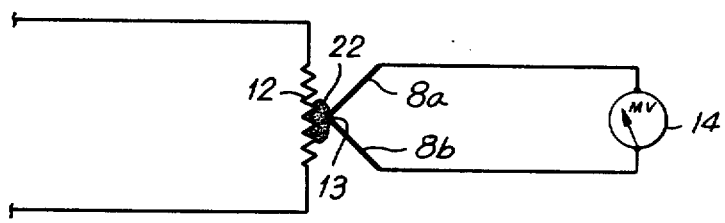
FIG. 5 is a schematic diagram showing the electrical circuitry involved in one aspect of FIG. 4.

A thermal converter made in accordance with further features of the present invention is shown in FIG. 4 where the resistive heater 12 is insulated from the thermal junction. A slender rod of type P thermoelectric semiconductor 8a is soldered to terminal 20a of the typical TO-5 transistor header. Tab 21 is used in locating the leads appropriately for external circuit connections. Another slender rod of type N thermoelectric semiconductor 8b is soldered to terminal 20b. The hot junction of elements 8a and 8b is formed by means of nickel strap 13 which is soldered to thermoelements 8a and 8b thereby joining them thermally and electrically and constitutes the hot thermojunction. Resistor 12 is soldered to terminals 20c and 20d by means of fine wires 12a and 12b. A light coating of a silicone adhesive 22 secures resistive body 12 to nickel strap 13. The silicone 22 is characterized by good thermal conductivity. In order to maintain a low time constant of the thermal converter, care is taken to use a minimum amount of silicone 22 in order to keep the thermal mass low. The resistor 12 is in good thermal contact with silicone 22 which conducts the heat to thermojunction 13. A thermal converter in accordance with FIG. 4 has been made with a heater resistance of 535 ohms which with a current of 4.39 milliamperes gave an output of 10 millivolts. Another thermal converter with a heater resistance of 24,000 ohms and a current of 0.72 milliampere gave an output of 10 millivolts. Thermal converters comparable to these have shown linearity in millivolts output as funtcion to the power input of less than .01% deviation from true square law response up to the 10 millivolt output level. The sensitivity of the two representative devices were respectively .96 mv./mw. and .806 mv./mw. Silicone 22 is an excellent electrical insulator, the consequence being that resistor 12 and thermojunction are virtually open circuit. A practical example has withstood voltages in excess of 100 volts. After assembly the TO-5 header is capped with a transistor can (not shown) by welding or by use of an epoxy adhesive. Further, by including a tubulation and evacuating the sealed header and can, a source of convection cooling is removed and the sensitivity is increased still further. FIG. 5 is the electrical representation that shows the use of the thermal converter of FIG. 4 to permit a high degree of precision in the measurement of RMS values. An alternating current (AC) with frequencies in excess of 100 kc. will cause deflection on meter 14. Removing the AC and substituting direct current (DC) thereof on resistor 12, the amount of DC that causes the same deflection on meter 14 that was caused by the AC in the first instance is the measure of RMS current. The schematic representation in FIG. 5 is not intended to be limiting but rather to show generally the techniques for the measurement of RMS values. Resistive heater 12 may be in shunt or series or in various combinations with external circuitry in a manner that will permit the measurement of current voltage or power. The relatively high output of the thermal converter of the present invention makes it suitable for sensing and detecting for use as an overload protector or an alarm indicator.

It will be apparent that the embodiments shown are only exemplary and that various modifications can be made within the scope of invention as defined in the appended claims.

What is claimed is:

1. A thermal converter including a rod of N-type thermoelectric semiconductor and a rod of P-type thermoelectric semiconductor, each of said rods having an end connected to an end of the other at a junction, a mount having respective terminals joined to and supporting the ends of said rods remote from said junction, a bead of resistive material of a higher order of resistivity than that of metals supported on said junction and in intimate heat transfer relation thereto, and a pair of fine wires of much smaller cross-section than said bead having respective ends embedded in said bead, said mount having means providing respective connections to the ends of said wires remote from the embedded ends thereof, said bead being a fired mass of palladium oxide, palladium, silver and glass powder.

2. A thermal converter for use in making measurements of alternating current signals extending at least into the radio frequency region, said thermal converter including a rod of N-type thermoelectric semiconductor and a rod of P-type thermoelectric semiconductor, each of said rods having an end connected to an end of the other by means constituting a junction, a mount having respective terminals joined to and supporting the ends of said rods remote from said junction, a bead of resistive material of a higher order of resistivity than that of metals supported on said junction and in intimate heat transfer relation thereto and essentially confined to said junction, and a pair of fine wires each having approximately a maximum diameter of 0.001 inch and each having a respective end embedded in said bead, said mount having means providing respective connections to the ends of said wires remote from the embedded ends thereof, said rods being of such slender dimensions and of such active thermoelectric semiconductor materials as to yield at least 0.5 millivolt per milliwatt input to said bead, thus providing a converter of high sensitivity which is capable of generating highly linear voltage output in relation to milliwatts of power input and which is highly immune to burn-out in case of overload.

3. A thermal converter for use in making measurements of alternating current signals extending at least into the radio frequency region, said thermal converter including a rod of N-type thermoelectric semiconductor and a rod of P-type thermoelectric semiconductor, each of said rods having an end connected to an end of the other by means constituting a junction, a mount having respective terminals joined to and supporting the ends of said rods remote from said junction, a bead of resistive material of a higher order of resistivity than that of metals supported on said junction and in intimate heat transfer relation thereto and essentially confined to said junction, and a pair of fine wires each having approximately a maximum diameter of 0.001 inch and each having respective ends embedded in said bead, one of said wires being connected to said junction, and a terminal carried by said mount connected to the other of said wires, said rods being of such slender dimensions and of such active thermoelectric semiconductor materials as to yield at least 0.5 millivolt per milliwatt input to said bead, thus providing a converter of high sensitivity which is capable of generating highly linear voltage output in relation to milliwatts of power input and which is highly immune to burn-out in case of overload.

4. A thermal converter for use in making measurements of alternating current signals extending at least into the radio frequency region, said thermal converter including a rod of N-type thermoelectric semiconductor and a rod of P-type theremoelectric semiconductor, each of said rods having an end connection to an end of the other by means constituting a junction, a mount having respective terminals joined to and supporting the ends of said rods remote from said juction, a miniature resistive heater supported on and in intimate thermal transfer relation to said junction and essentially confined to said junction, and means including a pair of fine wires extending from said heater, each of said wires having approximately a maximum diameter of 0.001 inch, and a pair of terminals for said heater on said mount, said wires being connected to said heater terminals, respectively, and electrical insulating heat-transfer means between said heater and said junction, said rods being of such slender dimensions and of such active thermoelectric semiconductor materials as to yield at least 0.5 millivolt per milliwatt input to said miniature resistive heater, thus providing a converter of high sensitivity which is capable of generating highly linear voltage output in relation to milliwatts of power input and which is highly immune to burn-out in case of overload.

5. A thermal converter for use in making measurements of alternating current signals extending at least into the radio frequency region, said thermal converter including a rod of N-type thermoelectric semiconductor and a rod of P-type thermoelectric semiconductor, each of said rods having an end connected to an end of the other by means constituting a junction, a mount having respective terminals joined to and supporting the ends of said rods remote from said junction, a bead of resistive material of a higher order of resistivity than that of metals supported on said junction and in intimate heat transfer relation thereto and essentially confined to said junction, and a pair of fine wires each having approximately a maximum diameter of 0.001 inch and said wires having respective ends embedded in said bead, said mount having a pair of terminals for the resistive bead connected to said wires, respectively, and means of minimal thickness providing electrical insulation and thermal conductivity between said junction and said bead, said rods being of such slender dimensions and of such active thermoelectric semiconductor materials as to yield at least 0.5 millivolt per milliwatt input to said bead, thus providing a converter of high sensitivity which is capable of generating highly linear voltage output in relation to milliwatts of power input and which is highly immune to burn-out in case of overload.

6. A high-frequency thermal converter for use in making measurements of alternating current signals extending at least into the radio frequency region, said thermal converter including a rod of N-type thermoelectric semiconductor and a rod of P-type thermoelectric semiconductor, means connecting an end of one of said rods to a closely adjacent end of the other of said rods to constitute a thermojunction, means supporting the ends of said rods remote from said thermojunction and providing respective terminals joined thereto, and a miniature resistive heater supported on and in intimate thermal transfer relation to said thermojunction and at least approximately confined within the outline of said thermojunction, said thermal converter including external terminals for said heater and means for providing connections from the external terminals to a pair of terminal connections to said heater, said last-named means comprising no metallic conductor whose cross-section per terminal connection is substantially greater than that of a 0.001 inch diameter wire, said rods being of such slender dimensions and of such active thermoelectric semiconductor materials as to yield at least 0.5 millivolt per milliwatt input to said miniature resistive heater, thus providing a converter of high sensitivity which is capable of generating highly linear voltage output in relation to milliwatts of power input and which is highly immune to burn-out in case of overload.

7. A thermal converter in accordance with claim 6, including electrically insulating heat-transfer material separating and filling the space between said resistive heater and said thermojunction.

8. A thermal converter in accordance with claim 6, wherein at least one of said terminal connections to said resistive heater includes a metallic connection as aforesaid extending away from said heater and said thermojunction.

9. A thermal converter in accordance with claim 6 wherein at least one of said terminal connections to said resistive heater includes a metallic connection as aforesaid extending away from said heater and said thermojunction, and including electrically insulating heat-transfer material separating and filling the space between said resistive heater and said thermojunction.

10. A thermal converter in accordance with claim 6 wherein one of said terminal connections to said heater is connected directly to said thermojunction.

11. A thermal converter in accordance with claim 6 wherein one of said terminal connections to said heater is connected directly to said thermojunction, and wherein the other terminal connection is a metallic connection as aforesaid extending away from said thermojunction.

12. A thermal converter in accordance with claim 6 including electrically insulating material separating and filling the space between said resistive heater and said thermojunction and wherein one of said terminal connections to said heater is connected directly to said thermojunction.

13. A thermal converter in accordance with claim 6 wherein said resistive heater has a pair of metallic connection as aforesaid forming at least part of said terminal connections, and including electrically insulating heat-transfer material separating and filling the space between said thermojunction and said resistive heater.

14. A thermal converter in accordance with claim 6 wherein said thermoelectric semiconductor rods are disposed side-by-side and said thermojunction extends across laterally aligned ends of said rods, wherein said resistive heater is mounted on the side of said thermojunction opposite to the side thereof connected to the ends of said rods, and wherein one of said terminal connections to said heater has a metallic connection as aforesaid directed away from said rods and said thermojunction.

15. A thermal converter in accordance with claim 6 wherein said supporting structure includes four terminals and means electrically insulating the four terminals from each other, two of said four terminals being said respective terminals joined to said ends of said rods, and wherein said terminal connections to said resistive heater include a pair of metallic connections as aforesaid extending directly to two others of said four terminals.

16. A high-frequency thermal converter for use in making measurements of alternating current signals extending at least into the microwave region, said thermal converter including a rod of N-type thermoelectric semiconductor and a rod of P-type thermoelectric semiconductor disposed side-by-side, a conductor bridging a laterally aligned pair of ends of said rods, said conductor forming a thermojunction, a miniature resistive heater at least approximately confined within the outline of said thermojunction, a layer of thermally conductive electrical insulating between said thermojunction and said resistive heater, a conductor joining one part of said heater to said thermojunction, and a fine wire connected to said resistor and extending away from said thermojunction and from said side-by-side rods, and an enclosure including a metal end part joined to said wire, a body remote from said end part and supporting the ends of said rods remote from said thermojunction, said body including metal parts forming terminals for the ends of said rods remote from said thermojunction, and a tube of insulation extending between said metal end part and said body, said tube enclosing said rods, said thermojunction, said resistive heater and said fine wire, said rods being of such slender dimensions and of such active thermoelectric semiconductor materials as to yield at least 0.5 millivolt per milliwatt input to said miniature resistive heater, thus providing a converter of high sensitivity which is capable of generating highly linear voltage output in relation to milliwatts of power input and which is highly immune to burn-out in case of overload.

References Cited

UNITED STATES PATENTS

| | | | |
|---|---|---|---|
| 1,618,744 | 2/1927 | Adams | 136—207 |
| 1,726,182 | 8/1929 | Johnson | 136—207 X |
| 2,922,955 | 1/1960 | Leboutet | 324—95 X |
| 3,026,363 | 3/1962 | Batteau | 136—207 X |
| 3,048,643 | 8/1962 | Winckler et al. | 136—200 |
| 3,052,846 | 9/1962 | Hill | 136—207 X |
| 3,128,428 | 4/1964 | Lush | 136—207 X |
| 3,304,206 | 2/1967 | Burdick et al. | 136—211 |
| 2,410,128 | 10/1946 | Paille | 136—207 |
| 3,342,646 | 9/1967 | Dingwall et al. | 136—205 |

ALLEN B. CURTIS, Primary Examiner

U.S. Cl. X.R.

324—95, 106